June 11, 1940. P. KOLLSMAN 2,203,824
DIRECTIONAL INSTRUMENT
Filed Jan. 31, 1940 2 Sheets-Sheet 1

INVENTOR
PAUL KOLLSMAN
BY Gunter Rathke
his ATTORNEY

June 11, 1940.                 P. KOLLSMAN                 2,203,824
                           DIRECTIONAL INSTRUMENT
                           Filed Jan. 31, 1940                 2 Sheets-Sheet 2

INVENTOR
PAUL KOLLSMAN
BY Gunter Rathke
his ATTORNEY

Patented June 11, 1940

2,203,824

UNITED STATES PATENT OFFICE 2,203,824

DIRECTIONAL INSTRUMENT

Paul Kollsman, New York, N. Y.

Application January 31, 1940, Serial No. 316,683
In Great Britain November 5, 1938

13 Claims. (Cl. 33—204)

This invention relates to improvements in directional instruments, more particularly direction indicating instruments for use on craft.

This invention is in part a modification of my turn indicator described in application Serial No. 156,550 filed July 30, 1937.

It is an object of this invention to provide an improved directional instrument capable of maintaining absolute direction with great accuracy and stability.

It is a further object of this invention to provide a novel directional instrument operating neither on a magnetic nor gyroscopic principle.

The present invention has for its object an instrument operating on the principle of determining deviation of a flow of fluid from an initial direction imparted to said flow. The deviation of the flow of fluid is utilized for determining a change in absolute direction to which the instrument may be subjected.

It is a further object of this invention to provide, in an instrument of the kind last described, means for biasing the instrument with respect to the magnetic north south direction.

From another aspect the invention has for an object to provide a navigating instrument particularly suited for indicating the direction of flight of a fast moving airplane in which the oscillation of the indicating element in rough air, or a northerly turning error, during a turn is eliminated.

More specifically the invention aims at providing means for directing a flow of fluid in a predetermined direction towards an axis, a rotor having surfaces exposed to the said flow whereby upon a turn imparted to the instrument about the said axis the fluid will cause a rotary motion of the rotor which is a multiple of the said turn, and a train of gears for operating indicating means in response to movements of the said rotor, said train of gears having a ratio of transmission inverse to the ratio of multiplication by the rotor of the turning movements imparted to the instrument. This arrangement will cause the indicating means to maintain absolute direction.

In describing and defining the present invention, the term "indicating means" is used to include a movable member used for the purpose of visible indication as well as for the purpose of actuating a relay in an automatic steering device in which case the movements of the said member may not necessarily be visible.

The invention thus relates equally to instruments serving as indicators or as a base line for automatic steering.

Further aims, objects and advantages of this invention will appear from a consideration of the description which follows with accompanying drawings showing for purely illustrative purposes an embodiment of this invention. It is to be understood, however, that the description is not to be taken in a limiting sense, the scope of this invention being defined in the appended claims.

Referring to the drawings.

Figure 1:
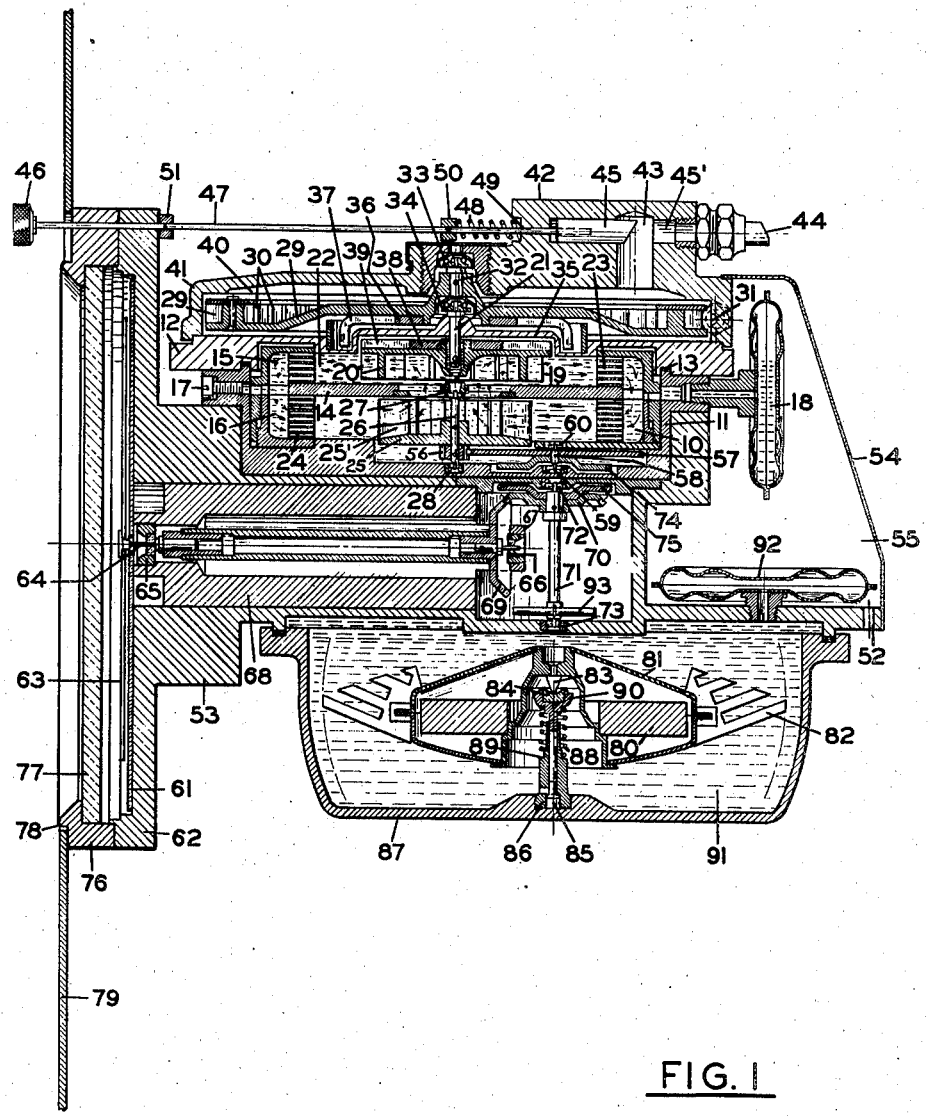
Fig. 1 is a vertical cross-section through an instrument embodying the present invention.

In Fig. 1, the instrument is shown as comprising a fluid chamber 10 of preferably toroidal shape formed of a lower part 11 and an upper part 12 held tightly together and sealed by a gasket 13. The fluid chamber contains a core 14 of toroidal form dividing the chamber 10 into an upper portion 15 and a lower portion 16.

The chamber 10 may be filled with a charge of fluid, preferably liquid, through an opening normally closed by a filling screw 17. An expansion chamber shown in the illustrated embodiment as being in the form of a diaphragm capsule 18 may be provided to permit an expansion and contraction of the fluid due to changes in temperature.

Means are provided for creating a flow of fluid within the chambers 15 and 16. In the illustrated embodiment a centrifugal pump rotor 19 is shown having blades 20 and mounted for rotation about a shaft 21 coaxial with the central axis of the toroidal chamber 10. If the rotor 19 is turned about the shaft, it will cause the fluid within the chamber 10 to circulate in the direction indicated by arrows 22.

For eliminating turbulence, caused by the rotor, guiding surfaces may be provided. In the illustrated embodiment a first set of guiding surfaces is shown in the upper portion 15 of the chamber at 23, a second set being shown in the lower portion 16 of the chamber at 24.

The fluid leaving the guiding surfaces 24 is free from turbulence and is directed in a direction radial towards the central axis of the chamber. The fluid will converge at the central axis and thence flow along the central axis and away from said axis to repeat the same circuit. Due to the decreasing cross-sectional area towards the central axis, the rate of flow of the fluid is greatly increased as the fluid particles approach the central axis.

About the central axis there is movable a second rotor 25 having radial vanes 25' acted upon by the fluid. These vanes make the rotor responsive to changes in the direction of the flow of fluid. The rotor 25 is mounted with its shaft 26 in bearings 27 and 28 preferably of the jewel type.

Means are provided for driving the centrifugal pump rotor 19. In the illustrated embodiment a prime mover of the turbine type is shown including a turbine rotor 29 having vanes or blades 30 at its circumference to be acted upon by a jet of pressure fluid directed thereonto from a nozzle 31. The turbine rotor has a shaft 32 supported in bearings 33 and 34.

For transmitting power from the prime mover to the centrifugal pump for circulating the fluid, there is shown a magnetic coupling driving the pump rotor 19 through a liquid-proof thin-walled portion 35 of the upper part 12 forming the fluid chamber 10. The magnetic coupling comprises a first magnetic element 36 secured to the turbine rotor 29 and curved at its ends to form pole pieces 37.

The second magnetic element or armature 38 is secured to the rotor 19 of the centrifugal pump and is preferably provided with pole pieces 39 at its ends corresponding in shape and number to the pole pieces of the driving magnetic element 36.

The turbine rotor 29 is enclosed within a chamber 40 formed by the upper portion 12 of the fluid chamber and a cover member 41. The cover member is provided with an extension 42 including an air passage 43 terminating at a pipe coupling 44. A valve may be provided to close the passage 43 for purposes later to be described.

In the illustrated embodiment an air valve is shown comprising a plunger 45 operable from a knob 46 through a rod 47. Means may be provided for normally maintaining the valve in an open position.

In the illustrated embodiment a helical spring 48 is shown bearing against a shoulder 49 in the extension 42 with one end and against a collar 50 on the rod 47 with the other. The movement of the rod is limited by a further collar 51 on the rod forming a stop. When the knob 46 is pushed inwardly, the plunger 45 enters the cylindrical portion 45' of the air passage 43 thereby shutting off the chamber 40 from the pipe coupling 44.

Fluid under pressure is supplied to the driving nozzle by withdrawing air from the chamber 40 through the air passage 43 which may be accomplished by connecting a suction pump to the pipe coupling 44. Air of atmospheric pressure will enter the instrument through openings 52 in a housing 53 in which the elements of the instrument are assembled. The housing may be closed at the rear by a cover 54 protecting the diaphragm capsule 18 and forming another chamber 55.

The chamber 55 is in communication with the driving nozzle 31 which is thus supplied with air at atmospheric pressure.

Due to the suction pressure existing in the turbine chamber 40 a jet of air will issue from the nozzle 34 impinging upon the blades of the turbine rotor to drive the same. The turbine rotor in turn through the magnetic coupling 36, 38 drives the centrifugal pump rotor 19.

The operation of the device so far described is as follows:

When a motion is imparted upon the instrument about the central axis of the fluid chamber, a tangential component is imparted to the fluid particles normally flowing in a radial direction towards the rotor 25. Due to the tangential component of movement of the fluid particles, the rotor 25 is rotated in one direction or the other depending upon the direction of turn imparted to the instrument.

The magnitude of the rotary movement of the rotor 25 depends on the magnitude of the turn imparted to the instrument and is a multiple thereof. In an instrument of the illustrated form, for example, the rotary movement of the rotor 25 will be about six times the turn imparted to the instrument. If, for example, an airplane on which the illustrated instrument is mounted makes a turn of 30°, the rotor 25 will amplify this turn and will make a rotary motion of six times 30°, that is 180°.

This amplified movement may be reduced again and thereby utilized for maintaining a movable member fixed with respect to absolute direction, that is fixed in azimuth in the illustrated embodiment.

In the illustrated assembly there is shown a gear train comprising a pinion 56 and a gear 57 having a ratio of transmission inverse to the ratio of amplification by the rotor 25 of a turning movement imparted to the instrument. The pinion 56 is secured to the shaft 26 of the rotor, the gear 57 having a shaft 58 mounted in bearings 59 and 60.

When thus a turn is imparted to the instrument, the turn will be multiplied by the rotor 25 and the multiplied motion again reduced by the train of gears 56, 57 so as to maintain the gear 57 fixed in space. The gear 57 may thus be used for operating a visible indicator or the movable member of a control relay in an automatic steering device.

In the ilustrated embodiment a visible indicator is shown comprising a dial 61 mounted in the front flange 62 of the housing 53 and a pointer 63 movable relatively to the dial. The pointer is carried by a shaft 64 supported in bearings 65 and 66, the latter bearing being formed in a bracket 67 extending from a tubular member 68 in the housing 53.

For rotating the pointer shaft 64 in response to the movement of the housing 53 relatively to the gear 57 maintaining absolute direction, a bevel gear train is shown. A first bevel gear 69 is carried by the pointer shaft and meshes with a second bevel gear 70 mounted on a shaft 71 movable in vertical bearings 72 and 73. The vertical shaft 71 may be directly connected to the gear 57.

In the illustrated embodiment, however, a magnetic coupling is shown comprising a first magnetic element 74 on the shaft 58 in the fluid chamber 10 and a second magnetic element 75 on the shaft outside of the said fluid chamber. The magnetic elements 74 and 75 are preferably made of equal pole strength as to make the magnetic coupling neutral with respect to the surrounding parts.

An indication of absolute direction is thus accomplished in the following manner:

As hereinbefore described, the gear 57 will remain fixed in azimuth. Accordingly, the shaft 71 magnetically coupled with the gear 57 will remain fixed in azimuth also. When a craft on which the instrument is mounted makes a turn, the turn is imparted to the instrument housing 53 which thus turns relatively to the shaft 71 and the bevel gear 70 mounted thereon, the bevel gear 69 will thus be caused to roll on the bevel gear 70 turning the pointer and indicating the amount of deviation from the initial direction.

In the illustrated embodiment, the instrument housing is closed at the front by means of a front ring 76 carrying a cover glass 77. The front ring 76 may be provided with a panel bead 78 to fit into an instrument panel 79.

With the structure thus far described, the instrument is capable of indicating absolute directions with sufficient accuracy over a substantial period of time. After a long period of time, however, during which the instrument was subjected to various turning movements, the gear 57 may deviate slightly from its initial position thus causing the pointer 63 to deviate also.

In this respect the instrument is comparable to a directional gyroscope which after being set in an initial position will maintain that position over a certain period of time after which the gyroscope and the indicator operated thereby will show a noticeable deviation from the initial position.

To correct this deviation resetting means may be employed or means may be provided for biasing the direction maintaining element towards a predetermined direction. The reference direction may be the direction of the earth's magnetic field. Accordingly, a magnetic compass element may be employed for biasing the directional instrument.

It is preferable to make the influence of a biasing element small as to become effective only over a substantial period of time to avoid errors from being introduced should the biasing element temporarily deviate from its proper position.

In the illustrated embodiment, a directional magnet 80 is shown enclosed in a float 81 provided with damping fins 82. The magnet, the float and the damping fins constitute a movable unit which, in the illustrated embodiment, is supported slightly above its center of gravity in a point 83 in a cup shaped bearing 84 for movement in azimuth and freedom to tilt relatively to the vertical axis.

The bearing 84 is mounted in a stem 85 slideable in a sleeve 86 mounted in a compass bowl 87 coaxially with the shaft 71. A spring 88 may be provided between the cup shaped portion 90 of the stem and a shoulder 89 on the sleeve. The compass bowl may be filled with a charge of liquid 91 and an expansion chamber shown in the form of a diaphragm capsule 92 may be provided to permit of expansion and contraction of the liquid 91 in response to changes in temperature.

The magnetic element is coupled with the direction maintaining shaft or element of the turn responsive instrument. In the illustrated embodiment a resilient coupling is provided including two follower magnets mounted to either side of the shaft 71, one of the magnets being visible in the drawing at 93. The magnetic coupling thus constituted by the follower magnets 93 and the directional magnet 80 may assume the form disclosed in my application No. 217,904 filed July 7, 1938.

The controlling or biasing influence of the magnetic element on the shaft 71 is relatively weak. If, for example, during a turn the magnetic element should temporarily deviate from its true north south direction, it will exert no appreciable influence on the shaft 71 and the indicator during the short time of disturbance.

Over a long period of time, however, during which the magnetic element is in its proper north south position, it will exert a torque on the shaft 71 should the said shaft have deviated from its correct position in azimuth thereby correcting the initial position of the instrument.

An almost instantaneous resetting of the instrument with respect to the magnetic north south position may be accomplished by rendering the fluid operated direction maintaining part of the device inoperative during the time of resetting. This may be done by closing the valve 45, 45' by pressing the knob 46.

The turbine rotor 29 will thus be deprived of its driving power and the circulation of the fluid within the chamber 10 will cease. The direction maintaining action of the rotor 25 thus being suspended, the magnetic element 80 will quickly, through the resilient couplings 80, 93 and 74, 75, turn the rotor 25 into the correct initial position.

If the knob 46 is released, the turbine rotor will again be supplied with driving energy and the fluid operated part of the instrument will resume its operation in the hereinbefore described manner.

The controlling torque of the magnetic directional element may be modified as to be relatively strong while the magnetic directional element is in its proper north south position, and as to be weak if the magnetic element deviates from its proper position. A torque limiting and biasing coupling may thus be employed between the magnetic element and the indicator, or the fluid operated part of the instrument respectively.

Figure 2:
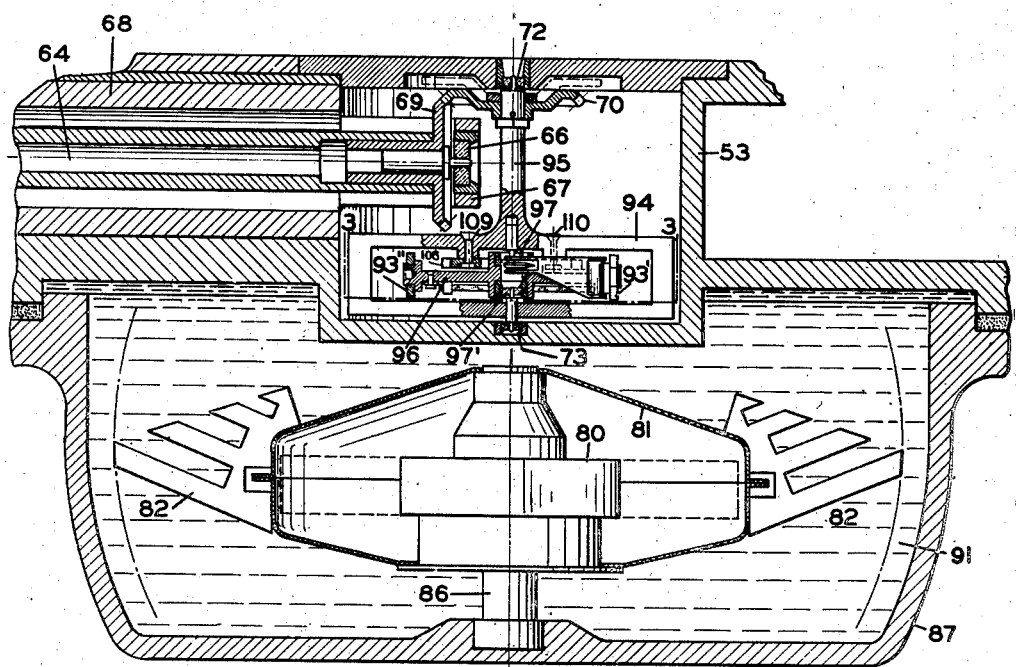
Fig. 2 is an enlarged vertical cross-section through a modified part of the instrument shown in Fig. 1.
Figure 3:
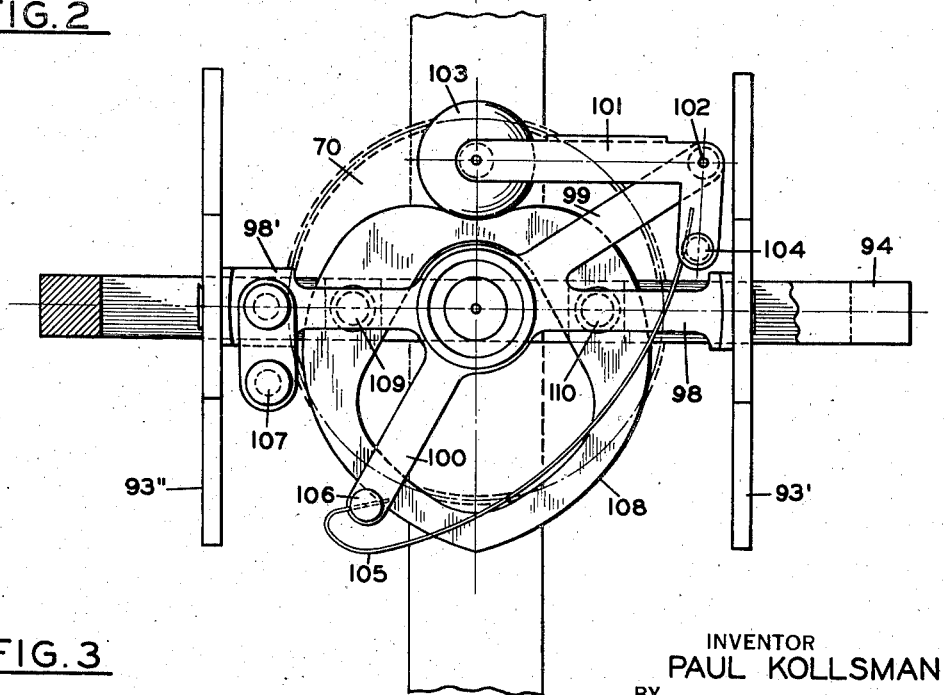
Fig. 3 shows in plan view on an enlarged scale an element of Fig. 2, a section being taken on line 3—3.

In Figs. 2 and 3, a modification of the instrument of Fig. 1 is shown including a torque limiting and biasing coupling of the type disclosed and claimed in my co-pending application, Serial No. 316,684, filed Jan. 31, 1940.

A movable frame 94 is substituted for the shaft 71 of Fig. 1, the frame having a shaft extension 95 for resting in bearings 72 and 73 of the housing 68. To the extension 95 there is secured the bevel gear 70 meshing with the gear 69 of the pointer shaft 64.

A support 96 is mounted within the frame 94 in bearings 97 and 97' coaxial with the shaft extension 95. The support carries the follower magnets 93' and 93" on arms 98 and 98'. The support has two further arm extensions 99 and 100.

A bell crank lever 101 is pivotally mounted on the arm extension 99 at 102 bearing a roller 103 at one end and a stud 104 at the other. The free end of a spring 105 bears against the stud 104, the spring being secured to the arm extension 100 at 106.

To balance for the mass carried by arm extension 99, a counterweight 107 may be mounted to the arm 98' to counterbalance the mass carried by arm extension 99.

The roller 103 movable with the support bears against the circumference of a cam 108 secured to the frame 94 at 109 and 110. The cam 108 may be heart-shaped and is shown eccentrically arranged as will appear from Fig. 3 as to cause the spring urged roller 103 to move into a position closest to the axis of the shaft 95.

The torque limiting and biasing coupling thus comprises two members movable relatively to each other, either one of which may be regarded as the driving or the driven element. The coupling is biasing in that the spring urged roller always tends to move into a predetermined position on the cam thereby aligning the driving and the driven member, in the illustrated embodiment, the support and the frame.

The coupling is also torque limiting as the roller will offer considerable resistance to its becoming displaced out of the indentation of the cam, the portion closest the central axis. The cam is preferably so shaped that for small displacements, the roller will move the bell crank lever a substantial amount about its pivot 102 against the action of the spring.

Thus the torque exerted by one of the members of the torque limiting and biasing coupling upon the other is considerable for small displacements of the roller out of the indentation in the neighborhood of which the cam is steep. In portions opposite the indentation, the cam is relatively flat thus causing only a small pivotal movement of the bell crank lever 101 per degree of relative movement between the elements of the coupling.

The operation of the torque limiting and biasing coupling in connection with the instrument hereinbefore described is as follows:

The biasing torque exerted on the fluid operated part of the instrument is relatively strong while the directional magnetic element is in its proper north south position. If, however, during a turn or a steep banking of the plane, the magnetic element is caused to deviate, the roller of the coupling will move out of the indentation onto the flat portion of the cam exerting only a very small torque upon the fluid operated part of the instrument.

The fluid operated part will thus prevent the pointer from being deviated from its correct position even during periods in which the position of the magnetic compass element is disturbed.

Obviously the present invention is not restricted to the particular embodiments herein shown and described. Moreover, it is not indispensable that all the features of the invention be used conjointly as they may advantageously be employed in various combinations and sub-combinations.

What is claimed is:

1. A direction indicating instrument for craft comprising, in combination, means for directing a flow of fluid in a predetermined direction towards, and converging from all sides at, an axis; a rotor mounted for rotation about said axis relatively to said flow directing means, said rotor having surfaces exposed to said flow whereby upon a turn imparted to said instrument about said axis said flow will be deflected from said predetermined direction imparting to said rotor a motion which is a multiple of said turn; indicating means; and a train of gears connecting said indicating means and said rotor, the ratio of transmission of the gear train being inverse to the ratio of multiplication by said rotor of the turning movements imparted to the instrument, whereby said indicating means will indicate absolute direction.

2. A direction indicating instrument for craft comprising, in combination, means for directing a flow of fluid in a predetermined direction towards, and converging from all sides at, an axis including means providing a path for said fluid of decreasing cross-sectional area towards said axis, thereby increasing the rate of flow; a rotor mounted for rotation about said axis relatively to said flow directing means, said rotor having radial surfaces exposed to said flow, whereby upon a turn imparted to said instrument about said axis said flow will be deflected from said predetermined direction imparting to said rotor a motion which is a multiple of said turn; indicating means; and a train of gears connecting said indicating means and said rotor, the ratio of transmission of the gear train being inverse to the ratio of multiplication by said rotor of the turning movements imparted to the instrument, whereby said indicating means will indicate absolute direction.

3. A direction indicating instrument for craft comprising, in combination, a casing providing a hollow chamber and having a core therein of substantially toroidal form having a central axis; a charge of fluid in said casing; means for circulating said fluid within said chamber about said core in a path substantially radially towards said central axis to converge at said axis, flow along said axis, and then away from said axis to repeat the same circuit; a rotor mounted for rotation about said axis relatively to said casing, said rotor having radial vanes exposed to said radially inward flow of fluid, thereby becoming responsive to changes in the direction of the flow of said fluid, incidental to a rotation imparted to said casing about said axis, the rotation of said rotor being a multiple of the rotation imparted to said casing; indicating means; and a train of gears connecting said indicating means and said rotor, the ratio of transmission of the gear train being inverse to the ratio of multiplication by said rotor of the turning movements imparted to the instrument, whereby said indicating means will indicate absolute direction.

4. A direction indicating instrument for craft comprising, in combination, a closed toroidal fluid chamber having a central axis; a toroidal core mounted coaxially therein; a charge of liquid filling the space between said core and chamber; a first rotor within said chamber for circulating said charge of liquid about said core in a path substantially radially towards said central axis to converge at said axis, flow along said axis, and then away from said axis to repeat the same circuit; an armature carried by said first rotor; a driving magnetic element mounted outside said chamber and coaxial with said first rotor acting on said armature; a prime mover connected to said magnetic element; a second rotor having radial vanes mounted within said chamber for rotation about said axis; guiding surfaces fixedly mounted within said chamber directing the converging liquid onto the vanes of said second rotor; indicating means outside said chamber; and actuating means for actuating through the wall of said chamber said indicating means in response to movements of said rotor which are a multiple of a rotary motion imparted to said chamber, said actuating means including a magnetic coupling comprising a first and second magnetic element inside and outside the said chamber, respectively, and a gear train the ratio of transmission of which is inverse to the amount of multiplication by said second rotor of a turning movement imparted to said chamber.

5. A directional instrument for craft comprising, in combination, means for directing a flow of fluid in a predetermined direction towards, and converging from all sides at, an axis; a rotor mounted for rotation about said axis relatively to said flow directing means, said rotor having surfaces exposed to said flow whereby upon a turn imparted to said instrument about said axis said flow will be deflected from said predetermined direction imparting to said rotor a motion which is a multiple of said turn; a rotatable member; a train of gears connecting said rotatable member and said rotor, the ratio of transmission of the gear train being inverse to the ratio of multiplication by said rotor of the turning movements imparted to the instrument; a directional compass magnet; and resilient coupling means connecting said rotatable member and said compass magnet for biasing said member towards a predetermined direction.

6. A directional instrument for craft comprising, in combination, means for directing a flow of fluid in a predetermined direction towards, and converging from all sides at, an axis; a rotor mounted for rotation about said axis relatively to said flow directing means, said rotor having surfaces exposed to said flow whereby upon a turn imparted to said instrument about said axis said flow will be deflected from said predetermined direction imparting to said rotor a motion which is a multiple of said turn; a member rotatable about a vertical axis; a train of gears connecting said rotatable member and said rotor, the ratio of transmission of the gear train being inverse to the ratio of multiplication by said rotor of the turning movements imparted to said instrument; a directional compass magnet mounted coaxially with said rotatable member; and a follower magnet connected to said member coupling said member to said compass magnet.

7. A direction indicating instrument for craft comprising, in combination, a closed toroidal fluid chamber having a central axis; a toroidal core mounted coaxially therein; a charge of liquid filling the space between said core and chamber; a first rotor within said chamber for circuating said charge of liquid about said core in a path substantially radially towards said central axis to converge at said axis, flow along said axis, and then away from said axis to repeat the same circuit; an armature carried by said first rotor; a driving magnetic element mounted outside said chamber and coaxial with said first rotor acting on said armature; a prime mover connected to said magnetic element; a second rotor having radial vanes mounted within said chamber for rotation about said axis; guiding surfaces fixedly mounted within said chamber directing the converging liquid onto the vanes of said second rotor; a first vertical shaft mounted inside said chamber; a train of gears connecting said second rotor and said vertical shaft, the ratio of transmission being inverse to the amount of multiplication by said second rotor of a turning movement imparted to said chamber; a second vertical shaft mounted coaxial with said first shaft outside of said chamber; magnetic coupling means for connecting said first and second shaft; a directional compass magnet mounted coaxially with said second shaft and coupled therewith; and indicating means connected to be operated from said second shaft.

8. A direction indicating instrument for craft comprising, in combwination, a closed toroidal fluid chamber having a central axis; a toroidal core mounted coaxially therein; a charge of liquid filling the space between said core and chamber; a first rotor within said chamber for circulating said charge of liquid about said core in a path substantially radially towards said central axis to converge at said axis, flow along said axis, and then away from said axis to repeat the same circuit; an armature carried by said first rotor; a driving magnetic element mounted outside said chamber and coaxial with said first rotor acting on said armature; a prime mover connected to said magnetic element; a second rotor having radial vanes mounted within said chamber for rotation about said axis; guiding surfaces fixedly mounted within said chamber directing the converging liquid onto the vanes of said second rotor; a first vertical shaft mounted inside said chamber; a train of gears connecting said second rotor and said vertical shaft, the ratio of transmission being inverse to the amount of multiplication by said second rotor of a turning movement imparted to said chamber; a second vertical shaft mounted coaxial with said first shaft outside of said chamber; magnetic coupling means for connecting said first and second shaft; a directional compass magnet mounted coaxially with said second shaft; resilient coupling means connecting said compass magnet and said second shaft; and indicating means connected to said second shaft, said indicating means including a vertical dial.

9. A direction indicating instrument for craft comprising, in combination, means for directing a flow of fluid in a predetermined direction towards, and converging from all sides at, an axis; a rotor mounted for rotation about said axis relatively to said flow directing means, said rotor having surfaces exposed to said flow whereby upon a turn imparted to said instrument about said axis said flow will be deflected from said predetermined direction imparting to said rotor a motion which is a multiple of said turn; a rotatable shaft; a train of gears connecting said shaft and said rotor, the ratio of transmission of the gear train being inverse to the ratio of multiplication by said rotor of the turning movements imparted to the instrument; a directional compass magnet; and indicating means resiliently coupled to both the compass magnet and said shaft.

10. A direction indicating instrument for craft comprising, in combination, means for directing a flow of fluid in a predetermined direction towards, and converging from all sides at, an axis; a rotor mounted for rotation about said axis relatively to said flow directing means, said rotor having surfaces exposed to said flow whereby upon a turn imparted to said instrument about said axis said flow will be deflected from said predetermined direction imparting to said rotor a motion which is a multiple of said turn; a rotatable shaft; a train of gears connecting said shaft and said rotor, the ratio of transmission of the gear train being inverse to the ratio of multiplication by said rotor of the turning movements imparted to the instrument; a directional compass magnet; a torque limiting and biasing coupling connecting said magnet and said rotatable shaft, said coupling including a first and a second rotatable member, a heart shaped cam on said first rotatable member, a roller on said second member and a spring urging said roller against said cam; and indicating means connected to be actuated from one of said members.

11. A direction indicating instrument for craft comprising, in combination, means for directing a flow of fluid in a predetermined direction towards, and converging from all sides at, an axis; a rotor mounted for rotation about said axis relatively to said flow directing means, said rotor having surfaces exposed to said flow whereby upon a turn imparted to said instrument about said axis said flow will be deflected from said predetermined direction imparting to said rotor a motion which is a multiple of said turn; a rotatable shaft; a train of gears connecting said shaft and said rotor, the ratio of transmission of the gear train being inverse to the ratio of multiplication by said rotor of the turning movements imparted to the instrument; a directional compass magnet mounted coaxially with said rotatable shaft; a torque limiting and biasing coupling including a first and a second rotatable member, a heart shaped cam on said first member, a roller on said second member, and a spring urging said roller against said cam; a first magnetic coupling between said compass magnet and one of said members; a second magnetic coupling between said shaft and the other of said members; and indicating means connected to the member which is coupled to the compass magnet.

12. A direction indicating instrument for craft comprising, in combination, a closed toroidal fluid chamber having a central axis; a toroidal core mounted coaxially therein; a charge of liquid filling the space between said core and chamber; a first rotor within said chamber for circulating said charge of liquid about said core in a path substantially radially towards said central axis to converge at said axis, flow along said axis, and then away from said axis to repeat the same circuit; an armature carried by said first rotor; a driving magnetic element mounted outside said chamber and coaxial with said first rotor acting on said armature; a prime mover connected to said magnetic element; a second rotor having radial vanes mounted within said chamber for rotation about said axis; guiding surfaces fixedly mounted within said chamber directing the converging liquid onto the vanes of said second rotor; a first vertical shaft mounted inside said chamber; a train of gears connecting said second rotor and said vertical shaft, the ratio of transmission being inverse to the amount of multiplication by said second rotor of a turning movement imparted to said chamber; a second vertical shaft mounted coaxial with said first shaft outside of said chamber; magnetic coupling means for connecting said first and second shaft; a directional compass magnet mounted coaxially with said second shaft and coupled therewith; indicating means connected to be operated from said second shaft; and manually operable control means for temporarily rendering said prime mover inoperative, whereby the instrument will be quickly reset with respect to the magnetic north south direction.

13. A direction indicating instrument for craft comprising, in combination, a closed toroidal fluid chamber having a central axis; a toroidal core mounted coaxially therein; a charge of liquid filling the space between said core and chamber; a first rotor within said chamber for circulating said charge of liquid about said core in a path substantially radially towards said central axis to converge at said axis, flow along said axis, and then away from said axis to repeat the same circuit; an armature carried by said first rotor; a driving magnetic element mounted outside said chamber and coaxial with said first rotor acting on said armature; a prime mover connected to said magnetic element; a second rotor having radial vanes mounted within said chamber for rotation about said axis; guiding surfaces fixedly mounted within said chamber directing the converging liquid onto the vanes of said second rotor; a first vertical shaft mounted inside said chamber; a train of gears connecting said second rotor and said vertical shaft, the ratio of transmission being inverse to the amount of multiplication by said second rotor of a turning movement imparted to said chamber; a second vertical shaft mounted coaxial with said first shaft outside of said chamber; magnetic coupling means for connecting said first and second shaft; a directional compass magnet mounted coaxially with said second shaft; resilient coupling means connecting said compass magnet and said second shaft; indicating means connected to said second shaft, said indicating means including a vertical dial; and manually operable control means for temporarily rendering said prime mover inoperative, whereby the instrument will be quickly reset with respect to the magnetic north south direction.

PAUL KOLLSMAN.